Dec. 13, 1949     R. I. STRONG     2,491,063
TWO-WHEELED TRAILER DRAFT MECHANISM
Filed Sept. 20, 1948                           4 Sheets-Sheet 1
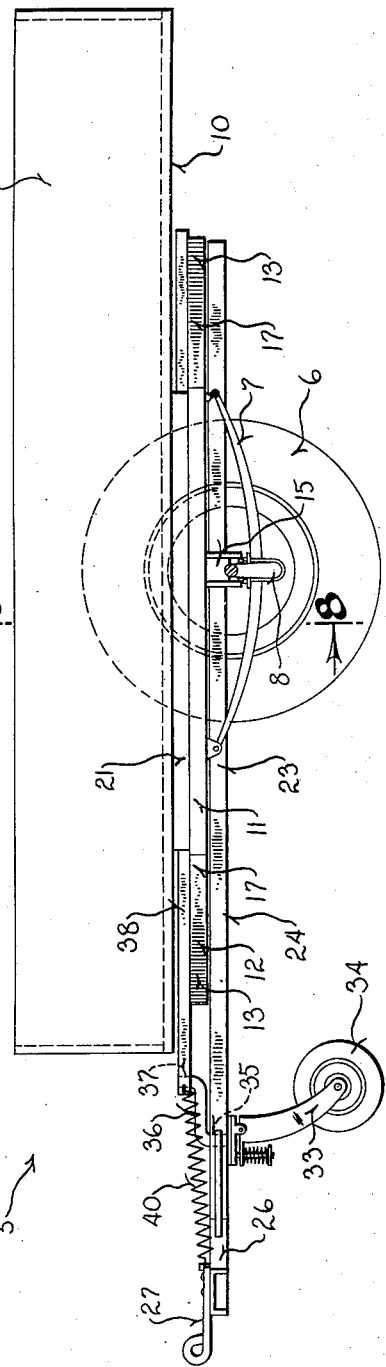
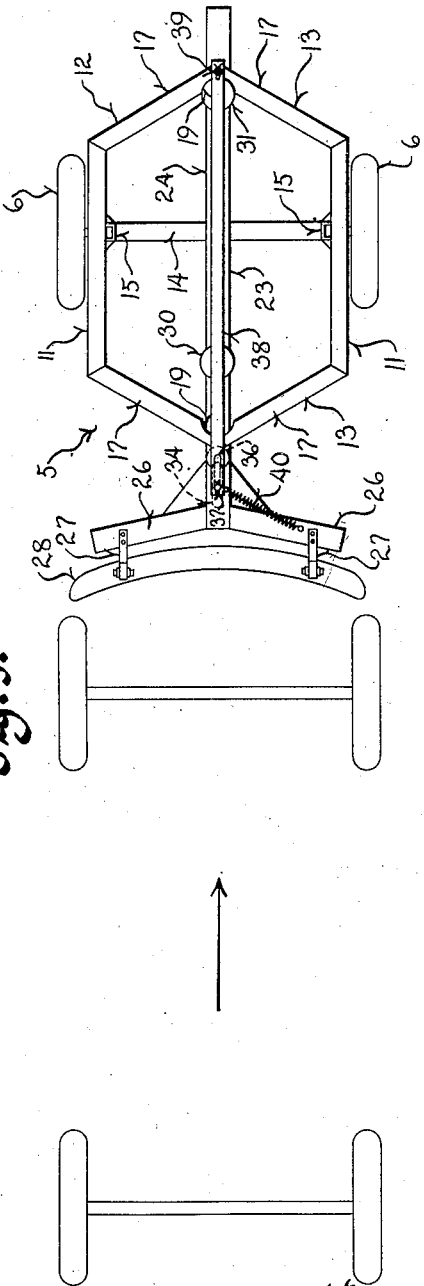
Inventor
Richard I. Strong
By Ira Milton Jones
Attorney

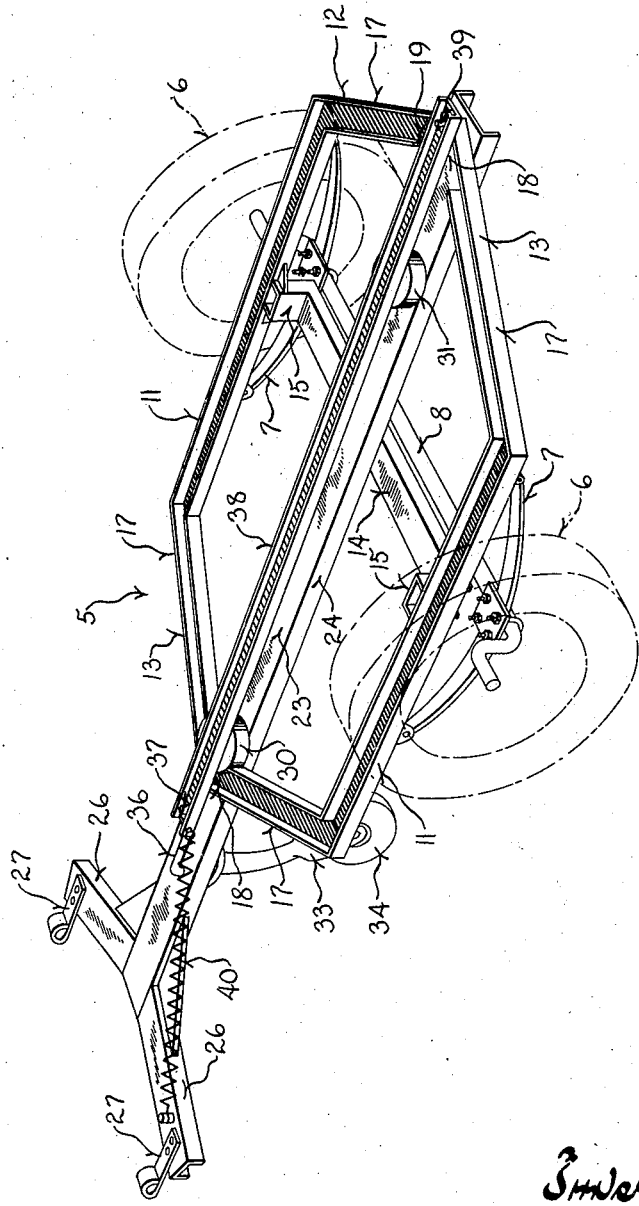

Dec. 13, 1949    R. I. STRONG    2,491,063
TWO-WHEELED TRAILER DRAFT MECHANISM
Filed Sept. 20, 1948    4 Sheets-Sheet 3
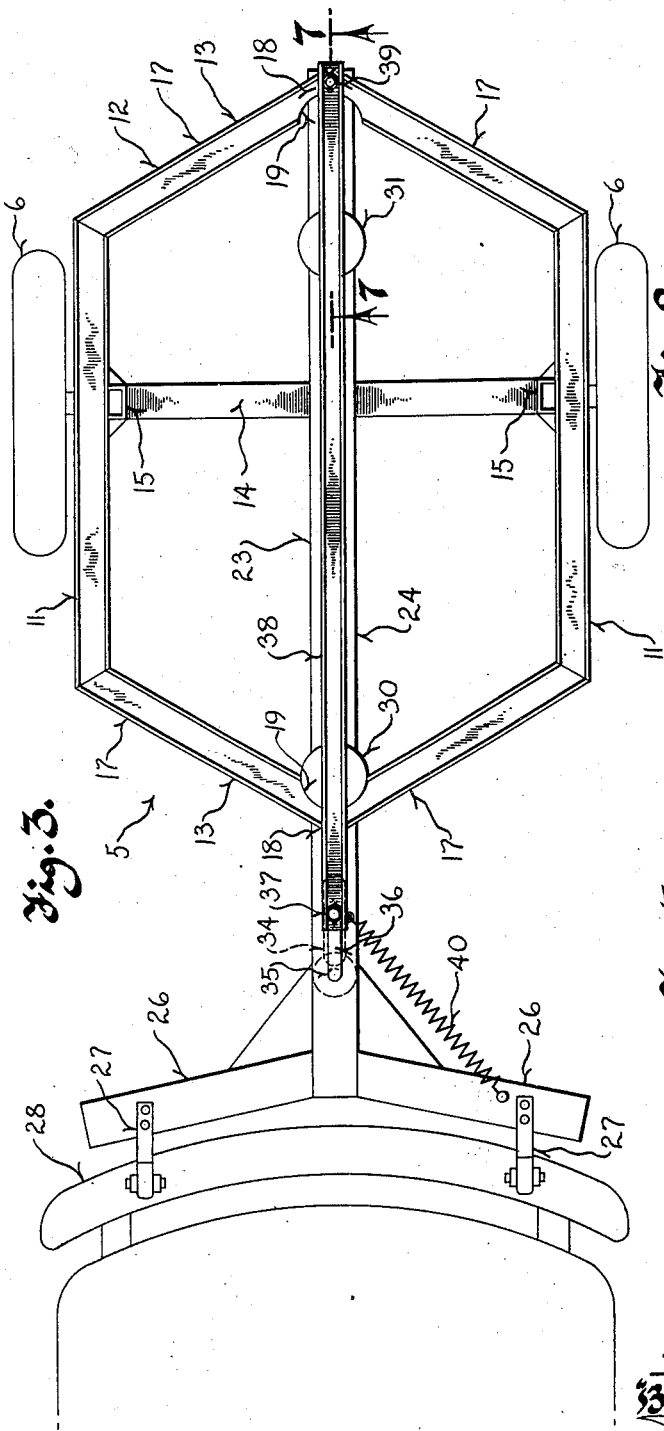
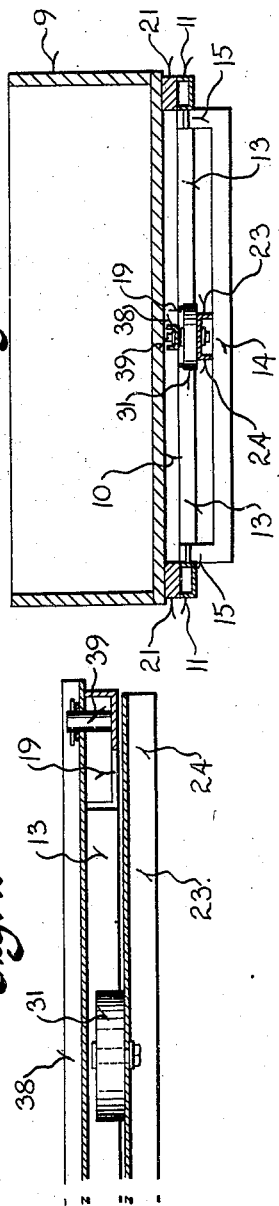
Inventor
Richard I. Strong
By Dec. 13, 1949    R. I. STRONG    2,491,063
TWO-WHEELED TRAILER DRAFT MECHANISM
Filed Sept. 20, 1948    4 Sheets-Sheet 4
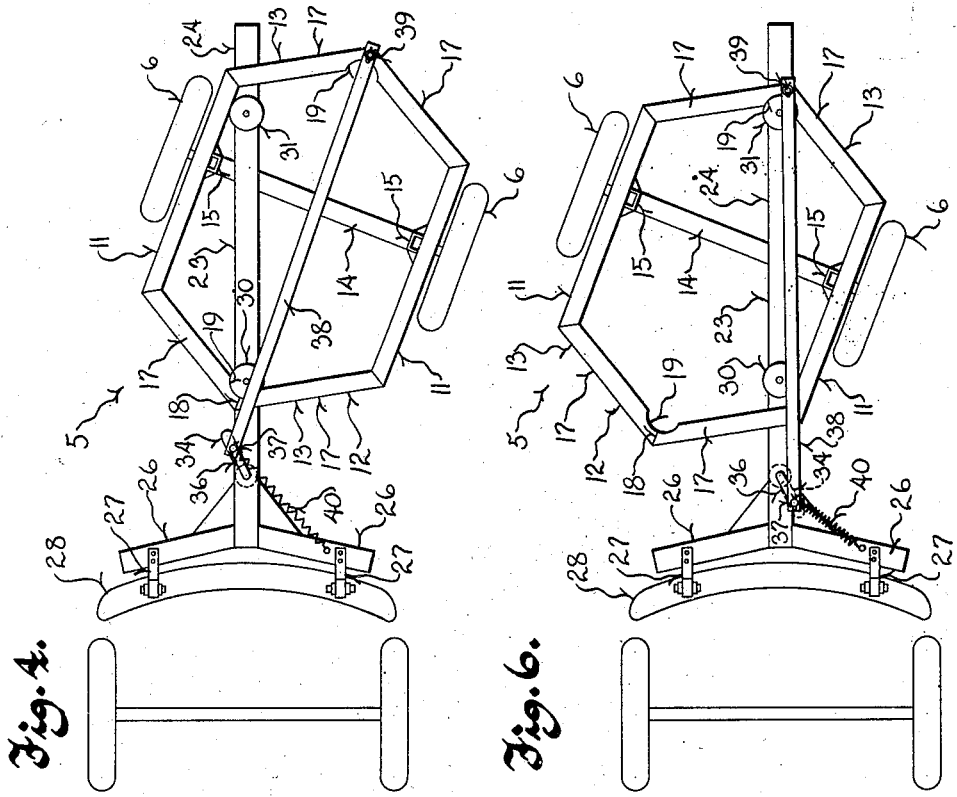
Richard I. Strong

Patented Dec. 13, 1949

2,491,063

UNITED STATES PATENT OFFICE 2,491,063

TWO-WHEELED TRAILER DRAFT MECHANISM

Richard I. Strong, Berlin, Wis.

Application September 20, 1948, Serial No. 50,107

11 Claims. (Cl. 280—33.4)

This invention relates to trailers and has more particular reference to trailers of the two-wheel type having a tongue which is adapted to be connected to the rear of an automotive vehicle to enable the trailer to be pulled forwardly or propelled rearwardly by the vehicle.

In the past, trailers of the type herein concerned have been provided with a tongue rigidly connected to the trailer body or chassis and extending forwardly thereof for attachment to the rear of an automotive vehicle by means of a universal join coupling. These couplings are designed to permit up-and-down as well as lateral swinging of the trailer about a pivot point directly adjacent to the rear of the vehicle to which it is connected.

While this manner of connection of the trailer to the vehicle was generally satisfactory during forward travel of the vehicle, it frequently necessitated much maneuvering on the part of the driver during reverse travel of the vehicle in order to push the trailer in the rearward direction desired. Pushing the trailer rearwardly around curves or turns was exceptionally difficult because of the tendency of the trailer to turn at a sharper angle than the vehicle.

With this and other objections to past trailers in mind, the present invention has as its main object the provision of a two-wheel trailer for automotive vehicles which will be easily controllable as to the direction of its travel during reverse travel of the trailer as well as forward travel thereof.

More specifically it is an object of this invention to provide a trailer for automotive vehicles wherein the tongue of the trailer has longitudinal motion relative to the trailer body, and wherein separate pivotal driving connections are automatically established between the tongue and the body forwardly and rearwardly of the wheel axis of the trailer during forward and reverse travel respectively of the trailer.

Another object of this invention resides in the provision of a trailer of the character described wherein longitudinal motion between the tongue and the trailer body to shift from one pivotal connection to the other is effected by means of a ground engaging castor wheel carried by the tongue to revolve upon a vertical axis through one-half a revolution whenever the direction of travel of the trailer is reversed.

With the above and other objects in view, which will appear as the description proceeds, this invention resides in the novel construction, combination and arrangement of parts substantially as hereinafter described and more particularly defined by the appended claims, it being understood that such changes in the precise embodiment of the herein disclosed invention may be made as come within the scope of the claims.

The accompanying drawings illustrate one complete example of the physical embodiment of the invention constructed according to the best mode so far devised for the practical application of the principles thereof, and in which:

Figure 1 is a side elevational view of the trailer of this invention, with the near wheel of the trailer removed to better illustrate details of construction;

Figure 2 is a perspective view of the trailer chassis with the body removed and with the wheels shown in construction lines;

Figure 3 is a plan view of the trailer chassis;

Figures 4, 5, and 6 are diagrammatic plan views of the chassis illustrating the manner in which the pivotal connections between the trailer and tongue are established during reversal in the direction of travel of the trailer; and Figure 7 is a fragmentary longitudinal sectional view taken through Figure 3 along the plane of line 7—7; and Figure 8 is a cross sectional view taken through Figure 1 along the plane of the line 8—8.

Referring now more particularly to the accompanying drawings in which like numerals indicate like parts, the numeral 5 generally designates the trailer of this invention. The two wheels 6 of the trailer are journaled for rotation on a common transverse axis, and opposite longitudinal leaf springs 7 anchored to the wheel axle 8 at their midportions support the trailer body 9 on their free ends. If desired, the ends of the leaf springs may be attached directly to the bottom wall 10 of the body, but as here shown, they are connected with the opposite parallel side rails 11 of a frame 12 fixed to the underside of the bottom wall of the body.

The frame 12 is relatively flat and is preferably of welded channel iron construction. Its side rails 11 which lie just inside the wheels 6, extend crosswise over the wheel axis to project a distance forwardly and rearwardly thereof, and have end rails 13 connected across their opposite ends.

The channels forming the side and end rails of the frame are all disposed with their backs facing downwardly, but a transverse channel iron 14 connected between the side rails 11 above and parallel to the wheel axle has its back uppermost but spaced a slight distance beneath the plane of the underside of the frame 12. This condition is achieved by having the opposite ends of the transverse channel 14 offset as at 15.

The end rails 13 are substantially V-shaped, that is, their arms 17 converge inwardly from their connections to the side rails and join one another, as at 18, on the longitudinal center line of the frame but beyond the opposite ends of the side rails. The V-shaped end rails thus have their open ends facing each other, and they cooperate with the side rails to give the frame a more or less hexagonal outline when viewed in plan as seen best in Figure 3. In addition each of the end rails has its apex 18 notched as at 19 with the notches being semi-circular and opening to the inside of the frame.

While the apexes 18 of the end rails are not located equal distances to opposite sides of the wheel axis, it will nevertheless be noted that the apexes of the end rails are spaced substantial distances forwardly and rearwardly of the wheel axis.

The trailer body or box 9 is connected to the frame 12 in any desired manner as by bolts (not shown) extending upwardly through the backs of the channels and through the bottom wall of the body, but it will be seen by reference to Figure 1 that the underside of the body is held in spaced parallel relationship to the upper side of the frame by means of spacers 21.

The tongue 23 of the trailer comprises a relatively long length of channel iron 24 which is confined, back uppermost, between the transverse channel 14 and the underside of the end rails of the frame for endwise and lateral sliding motion in a plane parallel to the plane of the frame. The rear end of the tongue normally projects slightly beneath the rearmost end rail, while the front of the tongue projects a substantial distance forwardly beneath the front end rail and has laterally extending arms 26, each provided with a hitch 27. The hitches 27 are fixedly attached to the arms 26 near their outer extremities and provide for connection of the tongue to the rear of an automotive vehicle, indicated at 28, and while they allow up-and-down pivotal motion of the tongue they preclude lateral swinging of the tongue with respect to the vehicle.

While the tongue has been described as being constrained to movement relative to the trailer body in a plane substantially parallel to the plane of the underside of the frame, it will be noted that the frame may also shift endwise or laterally with respect to the tongue. Such relative motion between the tongue and frame, however, is limited by means of a pair of rollers 30 and 31 mounted on the top of the tongue near the front and rear, respectively, thereof, and rotatable on vertical axes. Since the rollers are inside the frame, and their spacing is somewhat less than the apex-to-apex dimension of the end rails, it follows that relative motion between the tongue and frame both lengthwise of the tongue and laterally, is limited by the engagement of the rollers with the inside surfaces of the frame.

The rollers 30 and 31 are adapted to be separately engaged in the notches 19 of their adjacent end rails depending upon the direction of travel of the vehicle to which the tongue is attached. If the vehicle starts to travel forwardly the tongue is pulled forwardly with it and the forward roller 30 on the tongue will engage the inner side of either one of the converging arms 17 on the foremost end rail and be guided thereby into seating engagement in the adjacent notch 19 to establish a driving connection between the tongue and the trailer chassis.

This driving connection, as seen in Figures 2, 3 and 4 also permits pivotal motion of the trailer body with relation to the tongue which is fixed against lateral pivoting in use, and since the pivot axis of the connection is located well forwardly of the wheel axis of the trailer it will be apparent that the trailer will readily follow behind the vehicle whether the vehicle travels in a straight line or around curves and turns.

The driving and pivotal connection established between the tongue and trailer body by the engagement of the forward roller 30 in its notch 19 is disrupted upon reverse travel of the vehicle at which time the tongue of the trailer is slid endwise rearwardly upon its support 14 to engage the rearmost roller 31 with the inner inclined surfaces of the arms 17 of its adjacent end rail. Hence, during reverse travel of the vehicle the roller 31 rides inwardly along one or the other of the arms 17 to seat in the notch 19 in the rear end rail for the establishment of a driving connection between the tongue and the trailer body at a point well rearwardly of the axis of the wheels 6, as seen in Figures 5 and 6.

Since this driving connection also allows pivotal motion of the trailer body with relation to the tongue as shown in Figure 6, it will be apparent that a high degree of control over the direction of travel of the trailer is achieved during rearward travel of the vehicle to which it is connected. Not only will the trailer travel rearwardly in a straight line as well as it follows the vehicle in forward travel, but its performance in negotiating turns is vastly improved over that of conventional trailers wherein the pivot point or connection between the trailer and vehicle was at all times adjacent to the forward end of the tongue.

In the present case, however, with the tongue restrained against sidewise pivotal motion with respect to the vehicle, turns in reverse are negotiated with the path of the trailer wheels 6 nearly coinciding with the paths of the front wheels of the vehicle, as will be appreciated from a consideration of Figure 6. Likewise turns accomplished while the vehicle is traveling forwardly causes the trailer wheels to travel in a path nearly coinciding with the rear wheels of the vehicle as will be evidenced from a consideration of Figure 4.

Regardless of whether the trailer is being drawn forwardly or propelled rearwardly, either one or the other of the rollers 30 and 31 on the tongue is postively maintained engaged in the notch 19 of its adjacent end rail so as to avoid endwise jerking of the trailer relative to the vehicle. This is accomplished through the provision of a castor wheel 33 of a standard type and which is mounted on the front end of the tongue 23 to have the wheel 34 thereof engage the ground ahead of the trailer wheels 6, and to revolve on a vertical axis through one-half a revolution upon reversal of the direction of travel of the trailer. For this purpose the castor wheel has a stub shaft 35 projecting upwardly through and journalled in the tongue 23, and a crank-like lever 36 fixed to the upper end of the stub shaft 35 normally projects rearwardly over the tongue during forward travel of the trailer.

The outer end of the crank arm 36 is pivotally connected as at 37 with the front end of an elongated link 38 lying at the top side of the frame 12 in the space between the frame and the bottom wall of the trailer body. The rear end of the link is pivotally connected as at 39 with the rear end rail adjacent to the apex thereof and it will be apparent that the throw of the crank arm is such as to effect relative movement between the frame and tongue lengthwise of the latter the distance required to fully engage one or the other of the rollers 30 and 31 in its adjacent notch 19 upon one-half a revolution of the castor wheel during reversal of the direction of travel of the trailer.

Hence when the trailer is travelling forwardly the castor wheel trails and assumes the position shown in Figures 1, 2, and 3 and in this position the crank arm 36 is swung straight rearwardly over the tongue to hold the front roller 30 securely engaged in the notch 19 of its adjacent end rail, thereby preventing all but pivotal motion of the trailer with respect to the vehicle pulling the same.

When the direction of travel of the trailer is reversed the castor wheel is caused to revolve one-half a revolution upon its vertical axis to the position illustrated in Figure 5 to slide the frame of the trailer forwardly along the tongue thereby unseating the front roller 30 from its notch and effecting seating of the rear roller 31 in the notch 19 in its adjacent end rail. Such revolution of the castor wheel during the initial reaward travel of the vehicle may be facilitated by means of a tension spring 40 connected between one of the lateral arms of the tongue and the forward extremity of the link 38 so as to at all times exert a turning moment upon the shaft 35 of the castor wheel. The force of the spring, however, is relatively light and is easily overcome by the castor wheel while the trailer is either in forward or reverse travel.

It is essential to note that the tongue 23 is connected by means of the hitches 27 with the rear of the vehicle which is to draw the trailer in a manner precluding all but up-and-down swinging motion of the tongue such as is required to allow proper travel of the trailer over rough roads and the like. The hitches 27 positively preclude sidewise swinging of the tongue, and it is because of this fact coupled with the fact that the pivot connections between the tongue and the trailer frame shift with relation to the wheel axis, that the desirable directional control of the trailer is achieved.

From the foregoing description taken in connection with the accompanying drawings, it will be readily apparent to those skilled in the art that this invention provides a trailer of the two-wheel type which may be controlled as to direction equally as well during reverse travel of the trailer as during forward travel of the trailer.

What I claim as my invention is:

1. In a trailer of the type having a body supported by a pair of wheels rotatable on an axis transverse to the bottom wall of the body and between the front and rear ends thereof; an elongated tongue supported from the body adjacent to the bottom wall thereof for movement relative to said bottom wall in a plane substantially parallel thereto, one end of said tongue projecting from the front end of the body for connection to a vehicle to which the trailer is to be attached, and said tongue having its opposite end extending rearwardly of the wheel axis; cooperating stop and pivot forming members carried by the tongue and said bottom wall forwardly of said wheel axis and engageable upon forward motion of the tongue relative to the body to define one limit of endwise motion of the tongue relative to the body and for establishing a pivotal connection between the tongue and body in said limit permitting swinging of the body relative to the tongue about a substantially vertical axis forwardly of the wheel axis; other cooperating stop and pivot forming members carried by the tongue and said bottom wall rearwardly of said wheel axis and engageable upon rearward motion of the tongue relative to the body to define the other limit of endwise motion of the tongue relative to the body and to establish a second pivotal connection between the tongue and body in said other limit permitting swinging of the body relative to the tongue about a substantial vertical axis rearwardly of the wheel axis; and means carried by the tongue and operatively connected with the body for holding the forward stop and pivot forming members engaged in consequence to drawing of the trailer forwardly by its tongue, and for shifting the trailer body forwardly along the tongue to engage the rear stop and pivot forming members in consequence to pushing of the trailer in a reverse direction by its tongue.

2. The trailer set forth in claim 1 wherein said last named means comprises a castor wheel carried by the tongue to track upon the ground over which the trailer travels, said wheel being adapted to swing through one-half a revolution on its vertical axis in consequence to reversal of the travel of the trailer, and a connection between said castor wheel and the trailer body for translating such swinging of the castor wheel into motion of the trailer body along the tongue so as to effect establishment of one or the other of said pivotal connections between the trailer and the tongue.

3. In a trailer of the type having a body supported by a pair of wheels rotatable on an axis transverse to the bottom wall of the body and between the front and rear ends thereof; an elongated tongue supported from the body adjacent to the bottom wall thereof for movement relative to said bottom wall in a plane substantially parallel thereto, one end of said tongue projecting from the front end of the body for connection to a vehicle to which the trailer is to be attached, and said tongue having its opposite end extending rearwardly of the wheel axis; V-shaped end rails fixed to said bottom wall of the body at the front and rear ends thereof with their apexes on the longitudinal center line of the body and with their open ends facing one another; a pair of rollers carried by the tongue, one inside each of said V-shaped rails, and spaced apart less than the distance between the apexes of the rails so that endwise motion of the tongue relative to the body is limited by engagement of each roller with the apex of its adjacent end rails; and means carried by the tongue and operatively connected with the body for maintaining the forward roller engaged with the apex of its adjacent end rail in consequence to drawing of the trailer forwardly by its tongue, and for shifting the trailer body forwardly along the tongue to seat the rear roller in the apex of its adjacent end rail in consequence to pushing of the trailer in a reverse direction by its tongue.

4. The trailer set forth in claim 3 wherein said rollers on the tongue seat in socket-like notches in the end rails at their apexes.

5. In a trailer chassis of the type having a pair of wheels rotatable on a transverse axis: a substantially flat horizontal frame carried by said supporting wheels and including substantially V-shaped end rails, one located forwardly and the other rearwardly of the wheel axis, the apexes of said end rails pointing away from the wheel axis and lying on the longitudinal center line of the chassis; an elongated tongue carried by said frame at one side thereof for movement relative thereto and in a plane substantially parallel to the plane of the frame, said tongue having greater length than the end-to-end dimension of the frame; a pair of rollers carried by the tongue for cooperation with the end rails of the frames to define the limits of endwise shifting of the tongue relative to the frame, one of said rollers being seated in the apex of its adjacent end rail at each limit of movement of the tongue; a castor wheel carried by the tongue to revolve about a vertical axis and to track upon the ground over which the chassis is propelled by its tongue so that the castor wheel swings through one-half a revolution on its vertical axis whenever the direction of travel of the chassis is reversed; a crank carried by said castor wheel; and a connection between the crank and the frame whereby the revolution of the castor wheel during reversal of the travel of the chassis unseats one of said rollers from the apex of its adjacent end rail and seats the remaining roller in the apex of its adjacent end rail.

6. In a trailer having a pair of wheels journalled for rotation on a common transverse axis; a substantially flat frame supported by said wheels to occupy a substantially horizontal position during use of the trailer, said frame being adapted to have a trailer body mounted thereon and including spaced parallel side rails extending longitudinally over the wheel axis, and end rails connected across the ends of said side rails forwardly and rearwardly of the wheel axis, said end rails being substantially V-shaped with their open ends facing one another and having their apexes on the longitudinal center line of the frame; an elongated tongue carried by said frame at one flat side thereof for movement relative to the frame in a plane substantially parallel to the plane of the frame, said tongue extending across the end rails of the frame, and one end of the tongue being adapted for attachment with a vehicle to enable the trailer to be pulled forwardly or propelled rearwardly by the vehicle; a pair of rollers mounted on said tongue inside the frame but spaced apart a distance less than the apex to apex dimension of the frame, each of said rollers being adapted to be guided by the converging arms of its adjacent end rail to a position seated in the apex thereof upon relative movement in one direction between the frame and tongue lengthwise of the tongue to define separate pivotal connections between the tongue and frame permitting swinging motion of the frame relative to the tongue on vertical axes at either side of the wheel axis; a ground engaging castor wheel carried by the tongue and adapted to revolve through one-half a revolution on its vertical axis in consequence to reversal of the direction of travel of the trailer; and means connected between said castor wheel and the frame for translating such revolution of the castor wheel into motion of the frame along the tongue to engage the foremost roller in the apex of its adjacent end rail upon forward travel of the trailer and for effecting engagement of the rearmost roller in the apex of its adjacent end rail during reverse travel of the trailer.

7. The trailer set forth in claim 6 wherein said connecting means comprises a crank revoluble with the castor wheel, and a link pivotally connected between said crank and the frame of the trailer.

8. The trailer set forth in claim 7 further characterized by the provisions of a spring acting on said crank and tending to revolve the castor wheel out of the normal position which it occupies during forward travel of the trailer.

9. The trailer set forth in claim 6 wherein each of said end rails has a socket-like notch at its apex opening to the inside of the frame to receive its cooperating roller, and wherein the rollers are separately maintained in their respective notches by said castor wheel until the direction of travel of the trailer is reversed.

10. In a two-wheel trailer of the character described: a body having a bottom wall; an elongated tongue slidable relative to said body in a plane substantially parallel to said bottom wall; cooperating means on the tongue and said bottom wall engageable upon endwise sliding of the tongue in a forward direction relative to the body for establishing a pivotal driving connection between the tongue and body forwardly of the axis of the trailer wheels; other cooperating means on the tongue and said bottom wall engageable upon endwise sliding of the tongue in a rearward direction relative to the body for establishing a pivotal driving connection between the tongue and body rearwardly of the axis of the trailer wheels; and a pair of laterally spaced hitch devices on said tongue providing for connection thereof to an automotive vehicle and adapted to permit up-and-down swinging motion of the tongue while precluding lateral swinging of the tongue relative to the vehicle.

11. In a trailer having a body supported by a pair of wheels rotatable on an axis transverse to the bottom wall of the body and between the front and rear ends thereof: an elongated tongue for the trailer; means movably connecting said tongue with the trailer body to dispose the tongue in juxtaposition to the bottom wall of the body with one end of the tongue projecting forwardly from the front of the body, said connecting means providing for endwise movement of the tongue relative to and lengthwise of the body; cooperating means on the tongue and the bottom wall of the body engageable upon endwise forward sliding of the tongue relative to the body for establishing a pivotal driving connection between the tongue and body forwardly of the axis of said wheels; other cooperating means on the tongue and said bottom wall engageable upon endwise rearward sliding motion of the tongue relative to the body for establishing a second pivotal driving connection between the tongue and the body rearwardly of the axis of said wheels; and hitch means on the forwardly projecting end of the tongue providing for connection thereof to an automotive vehicle and adapted to permit up-and-down swinging motion of the tongue while precluding lateral swinging of the tongue relative to the vehicle to which it is connected.

RICHARD I. STRONG.

REFERENCES CITED

The following references are of record in the file of this patent:

UNITED STATES PATENTS

| Number | Name | Date |
| --- | --- | --- |
| 1,573,320 | Kline | Feb. 16, 1926 |
| 2,154,957 | Pinard | Apr. 18, 1939 |
| 2,432,357 | Vars | Dec. 9, 1947 |

FOREIGN PATENTS

| Number | Country | Date |
| --- | --- | --- |
| 782,643 | France | Mar. 18, 1935 |